United States Patent
Huang et al.

(10) Patent No.: US 11,673,278 B2
(45) Date of Patent: Jun. 13, 2023

(54) ROBOT JOINT MEMBER, DYNAMIC JOINT AND ROBOT WITH HEAT DISSIPATION STRUCTURE

(71) Applicant: Beijing Institute of Technology, Beijing (CN)

(72) Inventors: Qiang Huang, Beijing (CN); Wu Zhang, Beijing (CN); Donglin Qiu, Beijing (CN); Zhangguo Yu, Beijing (CN); Xingzhong Liu, Beijing (CN)

(73) Assignee: Beijing Institute of Technology, Beijing (CN)

( * ) Notice: Subject to any disclaimer, the term of this patent is extended or adjusted under 35 U.S.C. 154(b) by 418 days.

(21) Appl. No.: 17/035,231

(22) Filed: Sep. 28, 2020

(65) Prior Publication Data

US 2021/0339407 A1 Nov. 4, 2021

(30) Foreign Application Priority Data

Apr. 30, 2020 (CN) .......................... 202010366106.9

(51) Int. Cl.
*B25J 17/00* (2006.01)
*B25J 19/00* (2006.01)
*B25J 9/10* (2006.01)

(52) U.S. Cl.
CPC ........... *B25J 19/0054* (2013.01); *B25J 9/102* (2013.01); *B25J 17/00* (2013.01)

(58) Field of Classification Search
CPC .. F16H 57/04; F16H 57/0416; F16H 57/0415; F28F 3/04; B25J 19/0054
See application file for complete search history.

(56) References Cited

FOREIGN PATENT DOCUMENTS

| CN | 201050958 | 4/2008 | |
|---|---|---|---|
| CN | 101848629 | 9/2010 | |
| CN | 101861234 | 10/2010 | |
| CN | 104220831 | 12/2014 | |
| CN | 104589352 | 5/2015 | |
| CN | 104589352 A | * 5/2015 | .............. B25J 17/02 |

(Continued)

OTHER PUBLICATIONS

English translation of CN-104589352-A to Kirihara. (Year: 2015).*

(Continued)

*Primary Examiner* — Randell J Krug
(74) *Attorney, Agent, or Firm* — Hamre, Schumann, Mueller & Larson, P.C.

(57) ABSTRACT

The present disclosure provides a robot joint member, a dynamic joint and a robot with a heat dissipation structure. The joint member has a hollow barrel structure disposed to sleeve a heat source component, and a plurality of phase change heat dissipation units; the phase change heat dissipation unit comprises a phase change working medium, a capillary material and a sealed phase change cavity; heat dissipation auxiliary ribs are arranged on a periphery of the barrel wall of the joint member and a side of the phase change heat dissipation unit away from the heat source component; and the heat dissipation auxiliary ribs define a plurality of gas flow channels with cross sections gradually reduced along a gas flow direction. The joint member has can quickly eliminate the heat accumulation of the joint power source, and can keep a compact structure of the dynamic joint of the robot.

17 Claims, 6 Drawing Sheets

(56) References Cited

FOREIGN PATENT DOCUMENTS

| | | | |
|---|---|---|---|
| CN | 106602774 | | 4/2017 |
| CN | 106602774 A | * | 4/2017 |
| CN | 206559158 | | 10/2017 |
| CN | 210046685 | | 2/2020 |
| DE | 29711523 | | 7/1998 |
| JP | 2007-276067 | | 10/2007 |
| JP | 2010-258437 | | 11/2010 |

OTHER PUBLICATIONS

English translation of CN-106602774-A to Tang et al. (Year: 2017).*
What is a Sintered Heat Pipe, Tycorun.com, https://www.tycorun.com/blogs/news/what-is-a-sintered-heat-pipe (Year: 2022).*
First Chinese Office Action, issued in the corresponding Chinese patent application No. 202010366106.9, dated Mar. 26, 2021, 15 pages.
First Chinese Search Report, issued in the corresponding Chinese patent application No. 202010366106.9, dated Mar. 18, 2021, 6 pages.

* cited by examiner

A

ROBOT JOINT MEMBER, DYNAMIC JOINT AND ROBOT WITH HEAT DISSIPATION STRUCTURE

This application claims priority to Chinese Patent Application No. CN202010366106.9, filed on Apr. 30, 2020, which is hereby incorporated by reference in its entirety as if fully set forth herein.

TECHNICAL FIELD

The present disclosure relates to the field of robot technologies, and particularly, to a robot joint member, a dynamic joint and a robot with a heat dissipation structure.

BACKGROUND ART

As illustrated in FIGS. 1, 2 and 3, a dynamic joint 10 of a robot generally includes a motor 200, a reducer 400 and a joint member 100; the motor 200 and the reducer 400 are mounted in the hollow joint member 100, the motor 200 is energized to rotate to provide a power source to the dynamic joint, the motor 200 and the reducer 400 are connected through a transmission shaft 300 for transmission, a rotary speed output via the motor is reduced by the reducer 400 to increase an output torque, and the joint member 100 provides support, heat dissipation, mounting configuration and the like for various components. The motor is a main heat source of the joint, and the heat needs to be transferred to the outside of the dynamic joint for heat dissipation through the joint member. That is, the existing dynamic joint usually adopts a joint member without a heat dissipation structure, which substantially connects the heating source of the motor to the joint member directly, so as to take away the heat generated by the heating source of the motor by a heat conduction of the metal joint member itself for heat dissipation. In this way, the heat dissipation efficiency is low, which only meets the needs of general application working conditions with low requirements but is not suitable for dynamic joints with large torques.

In addition, some designers apply a liquid cooling method to the dynamic joint. The liquid cooling method is to add a liquid flow channel in the dynamic joint to take away the heat generated by the motor through the circular flow of liquid. In this way, it is necessary to connect the liquid flow channel to an external liquid cooling device to realize the circular flow of liquid. For example, a liquid cooling channel is reserved in a casing of the motor and is connected to an external liquid cooling circulation device. Although this liquid cooling method has a better heat dissipation efficiency relative to the joint without a heat dissipation structure, it often requires a large external heat dissipation circulation device, so the dynamic joint has a large volume and the mounting is inconvenient.

Neither the existing method that dissipates heat by a heat conduction of a joint member itself, nor the liquid cooling method meets the increasingly demand on larger output load and smaller volume of the joint unit of the robot. That is, although the existing heat dissipation method of the dynamic joint can meet the general heat dissipation performance requirements, it cannot deal with the working conditions expected by customers, such as continuous large torque output or high exploration overload, or there are problems such as too large external liquid cooling auxiliary device and slow influence, which cannot meet the requirements of larger output load and compact structure and size of the dynamic joint of the robot.

With the continuous improvement requirements of persistent large torque, high explosive force and high overload capacity of various robots, the loads of the dynamic joint and the motors are increasingly larger, which leads to the problem of heat accumulation in the motor. With the continuous output of the motor, if the accumulated heat cannot be effectively dissipated, the stability of the motor and the dynamic joint will be affected. Therefore, the heat dissipation problem of the motor has become an obstacle to the increasing power of the robot dynamic joint and has been increasingly severe, so it is increasingly urgent to solve the core heat dissipation problem of the dynamic joint.

SUMMARY OF THE DISCLOSURE

In view of the above problem, the present disclosure provides a robot joint member, a dynamic joint and a robot with a heat dissipation structure, so as to solve one or more problems existing in the prior art.

According to one aspect of the present disclosure, the present disclosure discloses a robot joint member with a heat dissipation structure, wherein the joint member has a hollow barrel structure disposed to be sleeved outside a heat source component, and a plurality of phase change heat dissipation units each axially distributed along a barrel wall;

the phase change heat dissipation unit comprises a phase change working medium, a capillary material and a sealed phase change cavity, wherein the phase change working medium is located inside the phase change cavity, the phase change cavity has a vacuum or negative pressure environment therein, and the capillary material is located on an inner cavity wall of the phase change cavity;

heat dissipation auxiliary ribs are arranged on a periphery of the barrel wall of the joint member and a side of the phase change heat dissipation unit away from the heat source component; and the heat dissipation auxiliary ribs define a plurality of gas flow channels with cross sections gradually reduced along a gas flow direction, so that gas flows are accelerated in the gas flow channels. The present disclosure disposes variable-area heat dissipation auxiliary ribs for a gas flow adjustment on a low-temperature side of the phase change heat dissipation units, so that the gas flow speed and the heat exchange efficiency are improved under the double effects of the Bernoulli principle and the negative pressure of the hot gas flow.

In some embodiments of the present disclosure, the phase change heat dissipation units are plural, uniformly distributed along a peripheral direction of the barrel wall, and located outside or inside the barrel wall.

In some embodiments of the present disclosure, the phase change working medium is a liquid-gas phase change working medium.

In some embodiments of the present disclosure, the capillary material is at least one of capillary metal, foam metal, foam carbon and sintered powder.

In some embodiments of the present disclosure, the phase change cavity of each of the phase change heat dissipation units is a non-penetrating groove or hole axially distributed along the barrel wall.

In some embodiments of the present disclosure, the heat dissipation auxiliary ribs are metal heat dissipation auxiliary ribs; each of the gas flow channels of the heat dissipation auxiliary ribs is axially distributed along the barrel wall; the heat dissipation auxiliary ribs are periodically distributed along the peripheral direction of the barrel wall, so that the plurality of gas flow channels formed are uniformly distributed along the peripheral direction of the barrel wall.

In some embodiments of the present disclosure, the plurality of gas flow channels comprise first gas flow channels and second gas flow channels alternately distributed along the peripheral direction of the barrel wall, wherein the first gas flow channels are distributed in a wedge shape in a first direction along the axial direction of the barrel wall and the second gas flow channels are distributed in a wedge shape in a second direction opposite to the first direction along the axial direction of the barrel wall.

In some embodiments of the present disclosure, the number of the plurality of gas flow channels and the plurality of phase change heat dissipation units are equal, and the plurality of gas flow channels and the plurality of phase change heat dissipation units are uniformly distributed along the peripheral direction of the barrel wall, with positions thereof corresponding to each other.

According to another aspect of the present disclosure, the present disclosure also discloses a robot dynamic joint with a heat dissipation structure, wherein the dynamic joint comprises the aforementioned robot joint member with the heat dissipation structure, and further comprises a motor, a transmission shaft and a reducer, wherein the joint member is disposed to sleeve the motor, and an inner sidewall of the joint member is in contact with a casing of the motor for transferring a heat flow to the phase change heat dissipation units based on a heat conduction path between the joint member and the motor.

According to still another aspect of the present disclosure, the present disclosure also discloses a bionic robot, comprising the aforementioned robot dynamic joint with the heat dissipation structure.

According to the joint member with the heat dissipation structure in the embodiments of the present disclosure, the phase change heat dissipation units are disposed along the barrel wall outside the heat source component, the heat generated by the heat source component is absorbed by the phase change working mediums inside the phase change heat dissipation units, and a phase change is produced to realize the heat release of the heat source component, which has a good heat conduction effect and a high heat dissipation efficiency. The heat accumulation of the joint power source can be quickly eliminated by the phase change circular heat dissipation. In addition, the phase change heat dissipation units are located on the joint member, so that the additional use of a liquid cooling pipeline is avoided, and the dynamic joint of the robot can keep a compact structure. In addition, the heat dissipation auxiliary ribs are disposed outside the joint member to form a plurality of variable-area gas flow channels, thereby further improving the gas flow speed and the heat exchange efficiency.

Additional advantages, objectives, and features of the present disclosure will be set forth in part in the following description, and in part will become apparent to persons of ordinary skill in the art upon examination the following text, or may be learned from the practice of the present disclosure. The objectives and other advantages of the present disclosure can be realized and attained by the structure particularly pointed out in the written description and claims hereof as well as the drawings.

Persons skilled in the art will understand that the objectives and advantages which can be achieved by the present disclosure are not limited to the above specific description, and the above and other objectives which can be achieved by the present disclosure will be more clearly understood from the following detailed description.

BRIEF DESCRIPTION OF THE DRAWINGS

The drawings described here are used to provide a further understanding of the present disclosure and constitute a part of this application, rather than limitations to the present disclosure. The components in the drawings are not drawn to scale, but merely to illustrate the principle of the present disclosure. For the convenience of illustrating and describing some parts of the present disclosure, corresponding parts in the drawings may be exaggerated, i.e., may become larger relative to other components in an exemplary device to be actually manufactured according to the present disclosure. In the drawings.

DETAILED DESCRIPTION OF THE PREFERRED EMBODIMENTS

Figure 1:
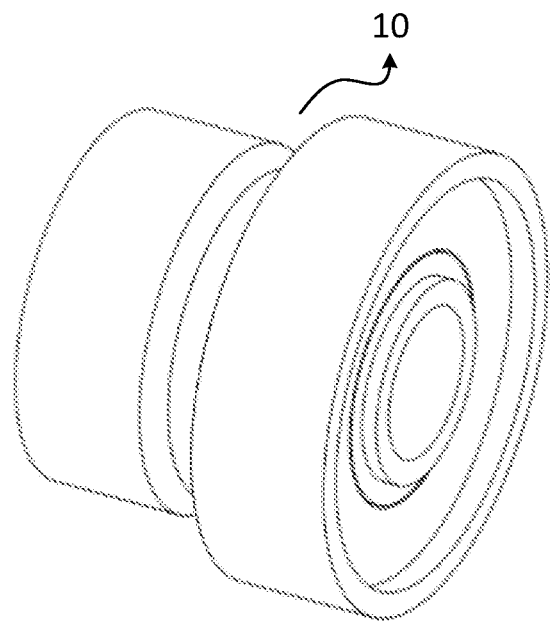
FIG. 1 is a structural diagram of a robot dynamic joint in the prior art.
Figure 2:
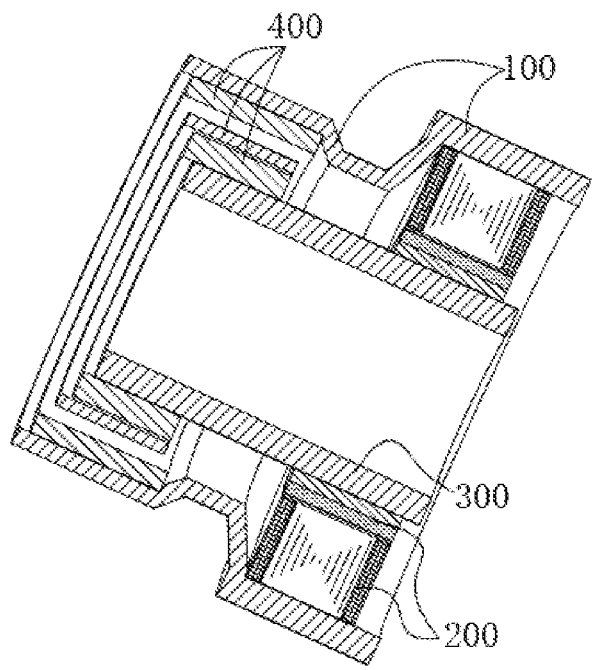
FIG. 2 is a sectional view of a robot dynamic joint illustrated in FIG. 1.
Figure 3:
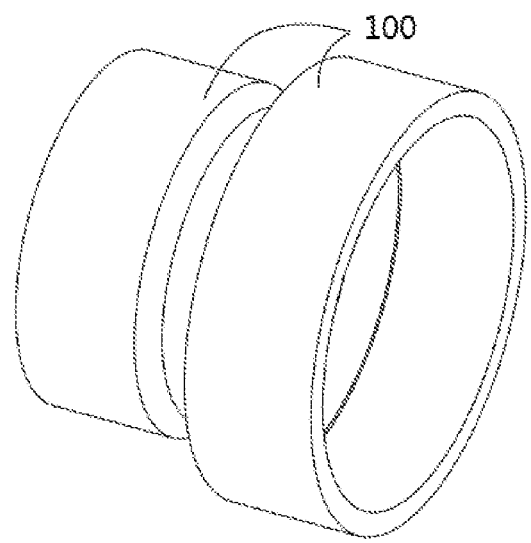
FIG. 3 is a structural diagram of a joint member in a robot dynamic joint illustrated in FIG. 1.

In order that the objectives, technical solutions and advantages of the embodiments of the present disclosure are clearer, the embodiments of the present disclosure will be further described in detail as follows with reference to the drawings. Here, the illustrative embodiments and the descriptions thereof are used to explain the present disclosure, rather than limitations to the present disclosure. In the drawings of the present disclosure, the same reference numerals refer to the same or similar components.

Here, it should be noted that in order to avoid obscuring the present disclosure due to unnecessary details, only the structures and/or processing steps closely related to the solutions of the present disclosure are illustrated in the drawings, and other details not very related to the present disclosure are omitted.

It should be emphasized that the term 'include/comprise/have' as used herein refers to the presence of features, elements, steps or components, but does not exclude the presence or addition of one or more other features, elements, steps or components.

Here, it should also be noted that the nouns of locality appearing in the specification refer to the locality illustrated in the drawings. Unless otherwise specified, the term 'connection' can refer to not only a direct connection, but also an indirect connection with an intermediate. The direct connection refers to a connection between two parts without any intermediate part, while the indirect connection refers to a connection between two parts by means of other parts. It should be understood that the dynamic joint herein can be applied not only to the mechanical arm structure of the industrial robot, but also to the leg structure of the legged robot.

Figure 4:
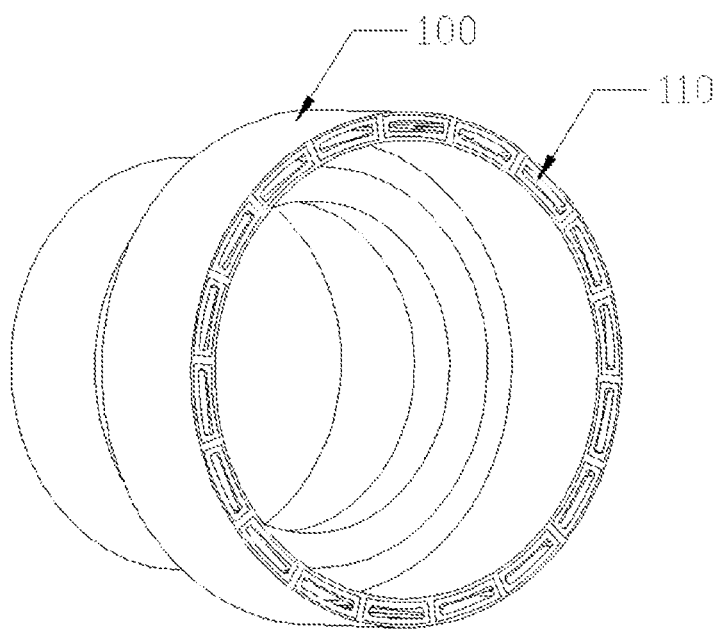
FIG. 4 is a structural diagram of a robot joint member with a phase change heat dissipation structure according to an embodiment of the present disclosure.

In order to solve the heat dissipation problem of the dynamic joint with large load, and meet the increasing performance requirements of the robot for the dynamic joint, the embodiments of the present disclosure provide a robot joint member with an innovatively designed heat dissipation structure, and a robot joint with the joint member. FIG. 4 is a structural diagram of a robot joint member 100 with a heat dissipation structure according to an embodiment of the present disclosure. As illustrated in FIG. 4, the joint member 100 has a hollow barrel structure, and a heat source component may be placed at a hollow position inside the barrel joint member 100, i.e., the joint member 100 with the barrel structure is sleeved outside the heat source component. The heat source component may be a dynamic member that generates heat, such as a motor, or it may also be other members that generate heat during operation, such as a reducer. One or more phase change heat dissipation units 110 are disposed on the barrel wall of the joint member 100 to dissipate heat from the heat source component inside the joint member 100. Each of the phase change heat dissipation units 110 may be axially distributed along the barrel wall. The phase change heat dissipation unit 110 includes a phase change working medium 113, a capillary material 112 and a phase change cavity 111. An inner cavity of the phase change cavity 111 is in a sealed state and in a vacuum or negative pressure environment. The phase change working medium 113 is located in the inner cavity of the phase change cavity 111, and the capillary material 112 is disposed on an inner cavity wall of the phase change cavity 111. It can be seen from FIG. 6 that the capillary material 112 is laid on the inner cavity wall of the phase change cavity 111, the phase change working medium 113 is located in an inner cavity formed by the capillary material 112 on respective sides of an inner sidewall of the phase change cavity 111, and the capillary material 112 can be fixed to the inner cavity wall by adhesion, etc.

There may be one or more phase change heat dissipation units 110 on the joint member 100, and when there is one, one phase change heat dissipation cavity which penetrates along a peripheral direction rather than an axial direction of the barrel wall of the joint member 100 can be directly formed at corresponding position in the barrel wall. When there are more phase change heat dissipation units 110, they may be uniformly distributed along the peripheral direction of the barrel wall, and a plurality of phase change heat dissipation cavities may be located outside or inside the barrel wall. The relative position between the phase change heat dissipation unit and the joint member will be described in detail through an example in which a plurality of phase change heat dissipation units 110 are disposed on the joint member. If one phase change heat dissipation unit is disposed on the joint member, it may be disposed in a similar way as the plurality of phase change heat dissipation units.

In a case where a plurality of phase change heat dissipation units are located inside the barrel wall, a plurality of grooves or holes extending along the axial direction and disposed uniformly along the peripheral direction may be built in the barrel wall, and sealed after being coated with the capillary material and filled with the phase change working medium, so as to form non-penetrating sealed phase change heat dissipation units. In a case where a plurality of phase change heat dissipation units are located on the barrel wall, i.e., a periphery of the barrel wall, a plurality of non-penetrating sealed phase change heat dissipation units may be formed firstly, and then each of the phase change heat dissipation units is tightly fixed on the barrel wall along the axial direction, so that the plurality of phase change heat dissipation units are uniformly distributed in the peripheral direction of the barrel wall. At this time, the heat generated by the heat source component located inside the joint member 100 during operation is transferred to the phase change heat dissipation units 110 located on the barrel wall of the joint member 100 through a heat conduction path between the heat source component and the joint member 100. The phase change working medium 113 inside the phase change heat dissipation unit 110 changes the phase state thereof based on the heat received. During the cyclic phase change process of the phase change working medium 113, the heat generated by the heat source component is transferred to the outside of the joint member 100, thereby avoiding the heat accumulation phenomenon of the heat source component. By disposing the phase change heat dissipation units 110 on the robot joint member 100, the cooling efficiency is improved as compared with the natural cooling method. Moreover, compared with the liquid cooling heat dissipation structure, the structural size of the robot dynamic joint with the phase change heat dissipation units can be reduced, and better heat conduction efficiency and heat dissipation efficiency can be achieved as compared with the circular liquid cooling method.

The phase change heat dissipation method of the phase change heat dissipation unit 110 may be a liquid-gas phase change, a solid-liquid phase change or a solid-gas phase change. The liquid-gas phase change belongs to the evaporative heat dissipation, wherein the phase change cavity is filled with the liquid-gas phase change working medium, and the dissipated heat is the phase change heat absorbed when the liquid working medium is converted into gas. The solid-liquid phase change belongs to the fusion heat dissipation, wherein the phase change cavity is filled with the solid-liquid phase change working medium, and the dissipated heat is the phase change heat absorbed when the solid working medium is converted to liquid. The solid-gas phase change belongs to the sublimation heat dissipation, and the dissipated heat is the phase change heat absorbed when the solid is working medium directly converted into gas. Preferably, the phase change heat dissipation method adopted by the robot joint member 100 in the embodiment of the present disclosure is the liquid-gas phase change, and the phase change working medium in the phase change cavity is the liquid-gas phase change working medium; the liquid-gas phase change working medium in the liquid state (liquid working medium) is filled in the inner cavity of the phase change cavity 111, and the liquid working medium quickly changes into gas after absorbing heat at the high-temperature side and again changes into liquid after releasing heat at the low-temperature side. Since the capillary material 112 is laid on the inner cavity wall of the phase change cavity 111, the liquid working medium can fall back into the cavity in the middle of the capillary material 112 under the capillary action of the capillary material 112 and the gravity of the liquid working medium, and further absorb heat at the high-temperature side. In this cycle, the heat generated by the heat source component is quickly discharged, i.e., a rapid heat dissipation of the heat source component is realized. It should be noted that the specific phase change heat dissipation method is not limited, as long as the heat dissipation of the heat source component can be realized.

Figure 5:
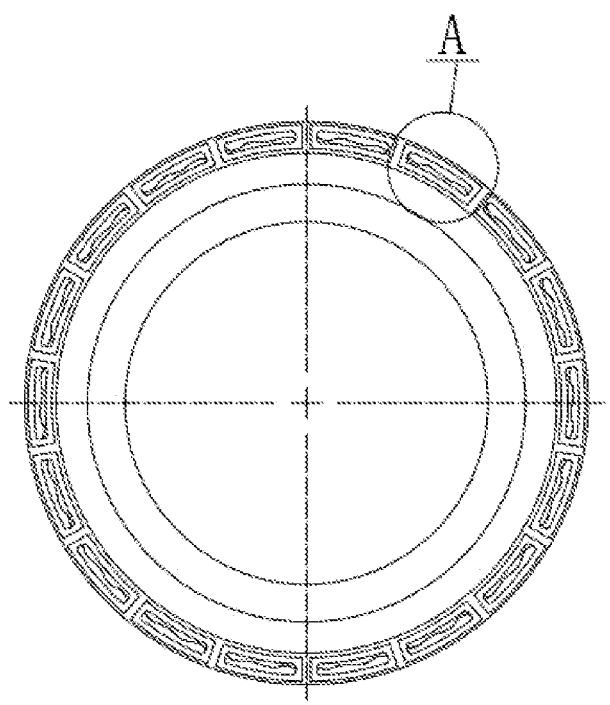
FIG. 5 is a front view of the robot joint member illustrated in FIG. 4.
Figure 6:
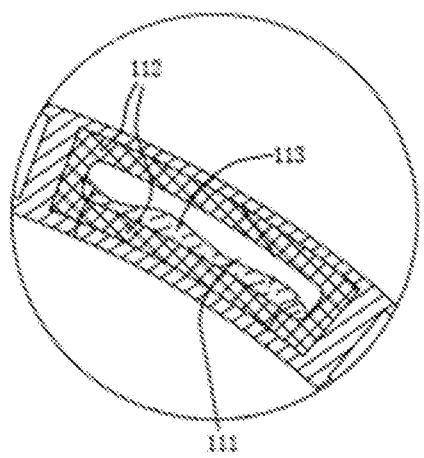
FIG. 6 is an enlarged view at A in FIG. 5.
Figure 7:
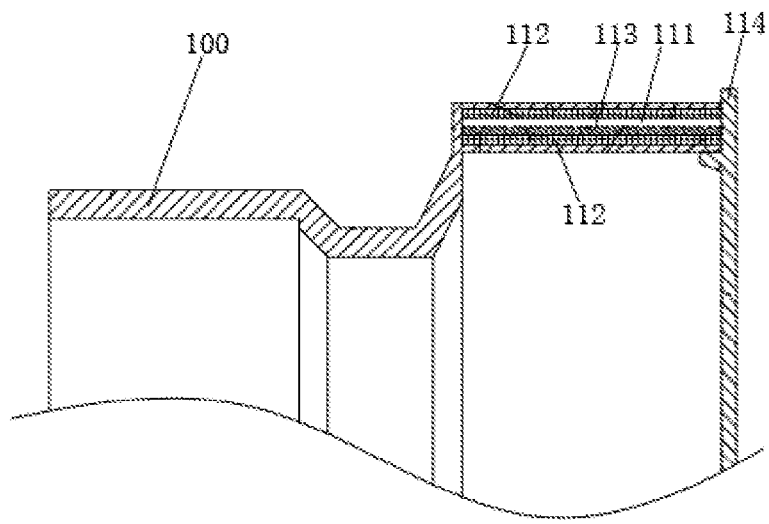
FIG. 7 is a partial sectional view of the robot joint member corresponding to FIG. 4.

FIG. 5 is a front view of the robot joint member illustrated in FIG. 4, FIG. 6 is an enlarged view at A in FIG. 5, and FIG. 7 is a partial sectional view of the robot joint member 100 according to an embodiment of the present disclosure. As illustrated in FIGS. 5 to 7, a plurality of phase change heat dissipation units are uniformly distributed along the peripheral direction of the barrel wall, and are built in the barrel wall (i.e., covered by the barrel wall). The phase change cavity 111 of each of the phase change heat dissipation units is a non-penetrating groove or hole axially distributed along the barrel wall, and the groove or hole may be further sealed by an end cover. In other embodiments, a plurality of phase change heat dissipation units may also be located outside the barrel wall, for example, a plurality of independent and sealed phase change heat dissipation units are uniformly fixed on the outer sidewall of the barrel. FIGS. 5 and 6 illustrate that a plurality of phase change cavities 111 are uniformly distributed on the barrel wall of the joint member 100. In addition, it is also possible to form a non-penetrating phase change channel on the barrel wall of the joint member 100 to surround the barrel wall, i.e., to form one phase change cavity 111 instead of a plurality of phase change cavities 111, so as to achieve the effect that can be achieved by a plurality of phase change heat dissipation units 110, and also improve the heat dissipation efficiency of heat source component. The capillary material 112 located in the phase change cavity 111 or the phase change channel may be selected from one or more of capillary metal, foam metal, foam carbon and sintered powder. The specific material type is not limited as long as the capillary action can be realized.

Figure 8:
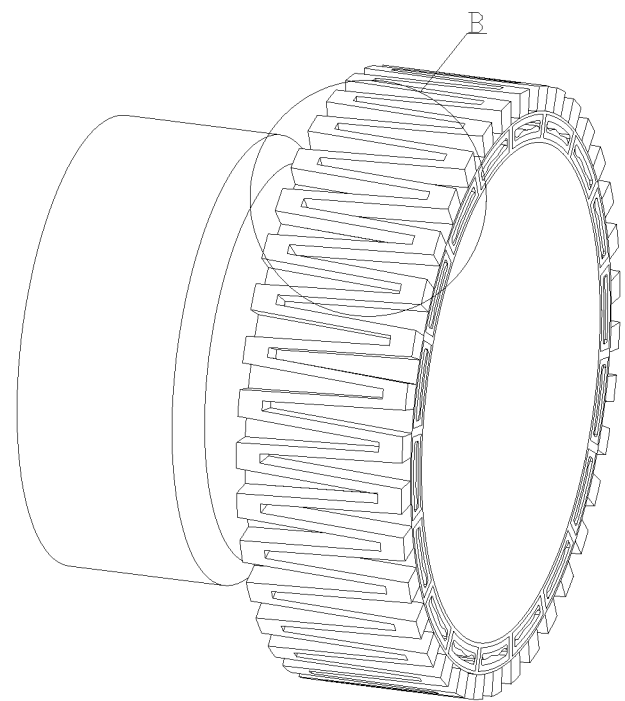
FIG. 8 is a structural diagram of a robot joint member with heat dissipation auxiliary ribs according to an embodiment of the present disclosure.
Figure 9:
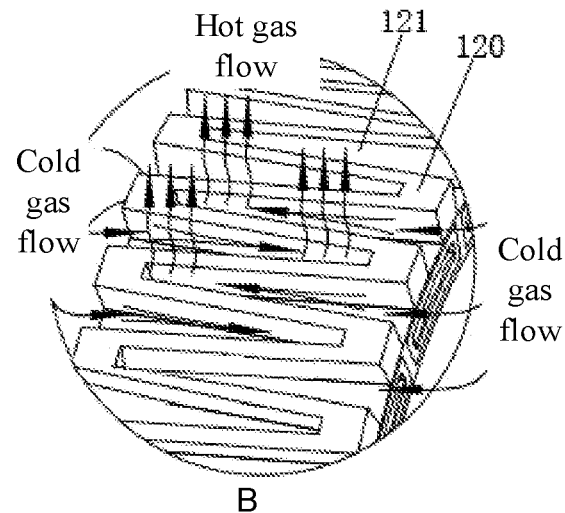
FIG. 9 is an enlarged view at B in FIG. 8.
Figure 10:
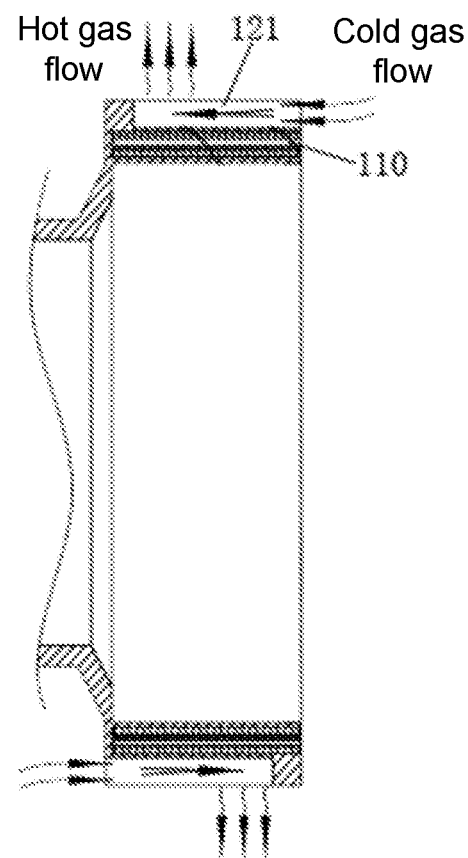
FIG. 10 is a partial sectional view of the robot joint member corresponding to FIG. 8.

In order to improve the gas flow speed and heat exchange efficiency, the robot joint member 100 is further provided with heat dissipation auxiliary ribs 120 for improving the heat exchange efficiency. FIG. 8 is a structural diagram of a dynamic joint according to an embodiment of the present disclosure, FIG. 9 is a partial enlarged view of a structure of the heat dissipation auxiliary ribs in FIG. 8, and FIG. 10 is a partial sectional view of the dynamic joint in FIG. 8. As illustrated in FIGS. 8 to 10, the heat dissipation auxiliary ribs 120 are provided on the periphery of the barrel wall of the joint member 100 and a side of the phase change heat dissipation unit 110 away from the heat source component. The heat dissipation auxiliary ribs 120 define a plurality of gas flow channels 121, and cross-sections of the formed gas flow channels 121 are gradually reduced along a gas flow direction, so that gas flows are accelerated in the gas flow channels according to the Bernoulli principle.

As illustrated in FIG. 8, the heat dissipation auxiliary ribs may be periodically arranged along a peripheral direction of an outer barrel wall of the joint member, and the periodically arranged heat dissipation auxiliary ribs define a plurality of periodically distributed variable-area heat dissipation gas flow channels. When the phase change heat dissipation units 110 are arranged along the axial direction of the joint member, the gas flow channels 121 may also be arranged along the axial direction of the joint member 100, and the cross sections of the gas flow channels 121 are gradually reduced along the gas flow direction from the gas inlet. According to the Bernoulli principle, when the gas flows in the gas flow channel 121 with a varying cross section, the flow speed will change accordingly. In the gas flow direction, the cross-section of the gas flow channel 121 of the heat dissipation auxiliary rib 120 is set to be gradually reduced along the gas flow direction from the gas inlet, so that the gas flows can be accelerated in the gas flow channel 121. During the phase change heat dissipation of the phase change heat dissipation unit 110, due to the accelerated flow effect of the cold gas flow on its low-temperature side in the gas flow channel 121 and the negative pressure suction effect of the hot gas flow located in a segment of the gas flow channel 121 with a small cross-sectional area, the cold gas flow enters from the side with a large cross-sectional area into the channel with a gradually narrowed cross-sectional area. Under the double effects of the Bernoulli principle and the negative pressure of the hot gas flow, the cold gas flow will be accelerated in the channel, so as to improve the heat exchange efficiency, quickly take away the heat, and eliminate the heat accumulation of the heat source component, thus improving the heat dissipation efficiency of the heat source component.

Further, a plurality of heat dissipation auxiliary ribs may be periodically arranged to define a plurality of gas flow channels, which may include first gas flow channels and second gas flow channels alternately distributed along the peripheral direction of the barrel wall. The first gas flow channels and the second gas flow channels are arranged in different directions respectively, wherein the first gas flow channels are distributed in a wedge shape in a first direction along the axial direction of the barrel wall, and the second gas flow channels are distributed in a wedge shape in a second direction opposite to the first direction along the axial direction of the barrel wall. At this time, the gas inlets of the first gas flow channel and the second gas flow channel are located at different positions of the barrel wall, respectively, and the gases also flow in different directions through the first gas flow channel and the second gas flow channel via the gas inlets, thus optimizing the heat dissipation effect.

For example, as illustrated in FIG. 8, the joint member 100 of the robot specifically may be a cylindrical barrel structure including a plurality of shaft segments. The heat source component is specifically disposed at a hollow position inside the cylindrical barrel, and a plurality of phase change heat dissipation units 110 are disposed on the barrel wall of the shaft segment where the heat source component is located. The heat source component is in direct contact with the joint member 100, so that a short heat conduction path is formed between the heat source component and the joint member 100, and the heat generated by the heat source component is transferred to the phase change heat dissipation unit 110 through the heat conduction path. A plurality of phase change heat dissipation units 110 may be spread all over the barrel wall of the joint member 100. Therefore, in a case where the outer wall of the heat source component is in effective contact with the inner sidewall of the joint member 100, the heat accumulation at each point on the periphery of the heat source component may be transferred to the phase change heat dissipation units 110 through the heat conduction path between the heat source component and the joint member 100, so that the heat source component can realize uniform heat dissipation in the peripheral direction. In addition, if the length of the phase change heat dissipation unit 110 in the axial direction of the joint member 100 is longer than that of the heat source component in the axial direction, uniform heat dissipation in the axial direction of the heat source component can also be realized. When a plurality of phase change heat dissipation units 110 are uniformly arranged along the peripheral direction of the barrel wall of the joint member 100, correspondingly, a plurality of heat dissipation auxiliary ribs and a plurality of gas flow channels arranged on the outer barrel wall (the low-temperature side of the phase change heat dissipation unit 110) of the joint member 100 are also uniformly arranged along the peripheral direction of the barrel wall, and the positions of the gas flow channel and the phase change heat dissipation unit may be corresponding to each other, so as to better improve the heat exchange efficiency of the heat source component. It should be understood that the specific structural form of the robot joint member 100 may not be specifically limited, for example, it may be any other structure including barrel structural sections, as long as a short heat conduction path can be maintained between the heat source component and the phase change heat dissipation unit 110 of the joint member 100.

The variable-area gas flow channel 121 for gas flow adjustment, which is located on the outer wall of the cylindrical barrel and defined by the heat dissipation auxiliary rib 120, has the cross-section gradually reduced along the gas flow direction, and its structure may be regarded as a wedge-shaped structure, with the corresponding heat dissipation auxiliary rib of a V-shaped structure. The heat dissipation auxiliary rib 120 and the cylindrical barrel may be separate parts, and a plurality of heat dissipation auxiliary ribs 120 are assembled on the outer barrel wall of the joint member 100, thus ensuring enough gas flow channels 121 in a limited space. The specific size of the heat dissipation auxiliary rib 120 may be designed according to the structure of the phase change heat dissipation unit 110 adopted. In order to achieve a better heat dissipation effect on heat source component, the number of the phase change heat dissipation units 110 and the heat dissipation auxiliary ribs 120 on the same joint member 100 may be set equally, with the positions of the phase change heat dissipation unit 110 and the heat dissipation auxiliary rib 120 corresponding to each other, i.e., the auxiliary ribs 120 are arranged on the low-temperature sides of the phase change heat dissipation units 110 relative to the heat source component, in a one-to-one corresponding relationship with the phase change heat dissipation units 110.

The heat dissipation auxiliary rib 120 and the joint member 100 may also be integrally formed, and the inlet of the gas flow channel 121 may be flush with an end of the shaft segment of the joint member 100 located outside the heat source component. A plurality of heat dissipation auxiliary ribs 120 of the V-shaped structure are alternately distributed on the outer sidewall of the joint member 100, so that the gas flow enters the gas flow channel 121 from two ends of the shaft segment located outside the heat source component, respectively, and is accelerated in the gas flow channel 121. The heat dissipation auxiliary rib 120 and the joint member 100 may be arranged independently in addition to the above processing manner, and finally connected by welding or bonding. In addition, the specific structural form of the heat dissipation auxiliary rib 120 and the specific arrangement mode thereof on the outer sidewall of the joint member 100 may be changed correspondingly based on the structure of the phase change heat dissipation unit 110, but the main function of the heat dissipation auxiliary rib 120 is to accelerate the heat dissipation of the heat source component by the phase change heat dissipation unit 110.

Figure 11:
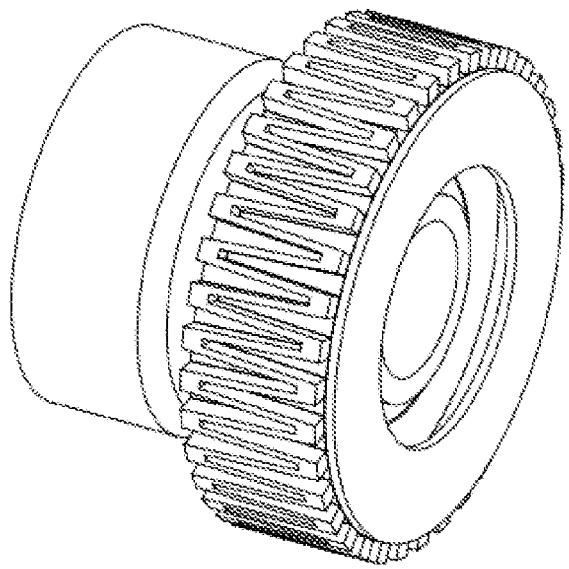
FIG. 11 is a structural diagram of a robot dynamic joint with a heat dissipation structure according to another embodiment of the present disclosure.
Figure 12:
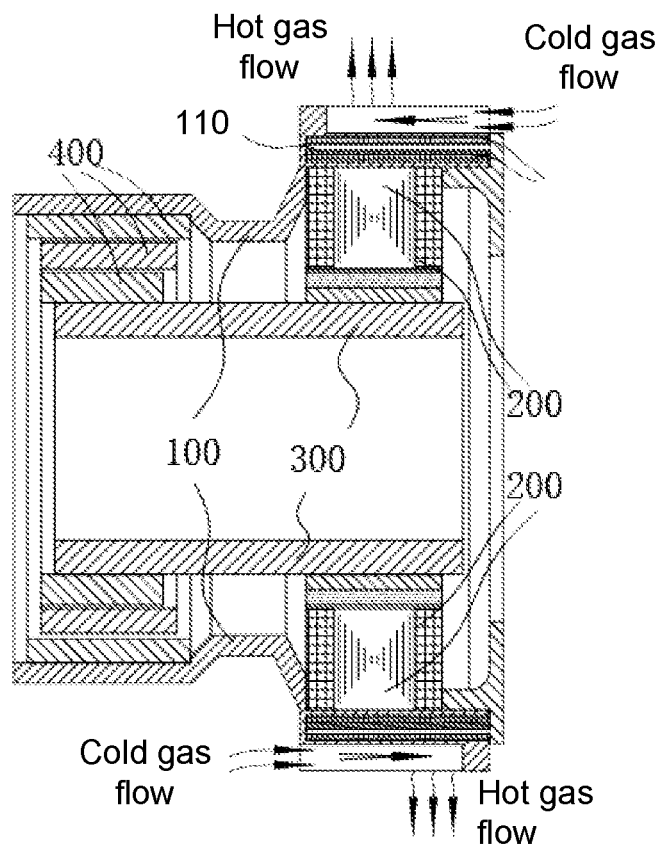
FIG. 12 is a sectional view of the robot dynamic joint illustrated in FIG. 11.

In one embodiment, the present disclosure further provides a robot dynamic joint with a heat dissipation structure. The dynamic joint adopts the robot joint member 100 with the heat dissipation structure in the above embodiment. As illustrated in FIGS. 11 and 12, the robot dynamic joint includes a motor 200, a transmission shaft 300, a reducer 400, and a robot joint member 100 with a heat dissipation structure. The motor 200 is disposed at a hollow position inside the joint member 100, and a heat conduction path is formed between a casing of the motor 200 and the phase change heat dissipation unit 110 of the joint member 100. The casing of the motor 200 can be directly contacted with the inner sidewall of the joint member 100, or a heat conductive material may be filled between the casing of the motor 200 and the inner sidewall of the joint member 100.

The motor 200 is further axially fixed in the shaft hole of the joint member 100 through an end cover 114, and a length of either the phase change cavity 111 or the heat dissipation auxiliary rib 120 on the joint member 100 may be larger than that of the motor 200. Further, the end cover 114 for axially fixing the motor 200 may also be used as a sealing end cover 114 of the cavity of the phase change cavity.

The speed of the motor 200 is transmitted to the reducer 400 through the transmission shaft 300 for a speed reduction output, thereby increasing the output torque and then improving the explosive force of the robot dynamic joint. In the dynamic joint, the motor 200 functioning as the heat source component will inevitably produce a phenomenon of heat accumulation through the transmission shaft. The heat generated by the motor 200 is dissipated under the joint action of the phase change heat dissipation unit 110 and the heat dissipation auxiliary rib 120 on the joint member 100, so that the motor 200 achieves a better heat dissipation efficiency. As compared with the method that adds a liquid cooling tube in the dynamic joint to realize a heat dissipation of the motor 200, it not only improves the heat dissipation efficiency, but also reduces the size of the whole dynamic joint under the requirement that the dynamic joint should have a continuous large torque output, so it is suitable for the bionic robot requiring a compact structure.

The present disclosure further provides a bionic robot, which comprises the dynamic joint in the above embodiment.

As can be seen from the above embodiments, the phase change heat dissipation units are disposed on the barrel wall of the robot joint member with a barrel structure, the heat generated by the heat source component is absorbed by the phase change working mediums inside the phase change heat dissipation units, and a phase change is produced to realize the heat release of the heat source component, which has higher heat conduction effect and heat dissipation efficiency. In addition, the phase change heat dissipation units are located on the barrel wall of the joint member, so that additional mounting of a heat dissipation device is avoided, and the dynamic joint can keep a compact structure in a case where the dynamic joint continuously outputs a large torque. In addition, the outer barrel wall of the joint member is provided with variable-area heat dissipation auxiliary ribs with gradually varying cross-sectional areas to adjust the gas flow speed, which accelerates the gas flow speed and the conversion efficiency, further improves the heat exchange efficiency of the phase change heat dissipation units, and improves the heat dissipation efficiency of the heat source component.

In the present disclosure, the features described and/or illustrated with respect to one embodiment may be used in one or more other embodiments in the same or similar way, and/or be combined with the features in other embodiments, or take place of those features.

The above embodiments illustrate and describe the basic principle and main features of the present disclosure, but the present disclosure is not limited thereto. Any amendment, equivalent change and modification made by persons skilled in the art without paying any creative effort should fall within the protection scope of the technical solutions of the present disclosure.

The invention claimed is:

1. A robot joint member with a heat dissipation structure, comprising a joint member,
    wherein:
        the joint member has a hollow barrel structure disposed to be sleeved outside a heat source component, and at least one phase change heat dissipation unit each axially distributed along a barrel wall;

the phase change heat dissipation unit comprises a phase change working medium, a capillary material and a sealed phase change cavity, wherein the phase change working medium is located inside the phase change cavity, the phase change cavity has a vacuum or negative pressure environment therein, and the capillary material is located on an inner cavity wall of the phase change cavity;

heat dissipation auxiliary ribs are arranged on a periphery of the barrel wall of the joint member and a side of the phase change heat dissipation unit away from the heat source component;

and the heat dissipation auxiliary ribs define a plurality of gas flow channels with cross sections gradually reduced along a gas flow direction, so that gas flows are accelerated in the gas flow channels.

2. The robot joint member according to claim 1, wherein the phase change heat dissipation units are plural, uniformly distributed along a peripheral direction of the barrel wall, and located outside or inside the barrel wall.

3. The robot joint member according to claim 2, wherein the number of the plurality of gas flow channels and the plurality of phase change heat dissipation units are equal, and the plurality of gas flow channels and the plurality of phase change heat dissipation units are uniformly distributed along the peripheral direction of the barrel wall, with positions thereof corresponding to each other.

4. The robot joint member according to claim 1, wherein the phase change working medium is a liquid-gas phase change working medium.

5. The robot joint member according to claim 1, wherein the capillary material is at least one of capillary metal, foam metal, foam carbon and sintered powder.

6. The robot joint member according to claim 1, wherein the phase change cavity of each of the phase change heat dissipation units is a non-penetrating groove or hole axially distributed along the barrel wall.

7. The robot joint member according to claim 1, wherein,
the heat dissipation auxiliary ribs are metal heat dissipation auxiliary ribs;
each of the gas flow channels of the heat dissipation auxiliary ribs is axially distributed along the barrel wall;
the heat dissipation auxiliary ribs are periodically distributed along the peripheral direction of the barrel wall, so that the plurality of gas flow channels formed are uniformly distributed along the peripheral direction of the barrel wall.

8. The robot joint member according to claim 1, wherein the plurality of gas flow channels comprise first gas flow channels and second gas flow channels alternately distributed along the peripheral direction of the barrel wall, wherein the first gas flow channels are distributed in a wedge shape in a first direction along the axial direction of the barrel wall and the second gas flow channels are distributed in a wedge shape in a second direction opposite to the first direction along the axial direction of the barrel wall.

9. A robot dynamic joint with a heat dissipation structure, comprising:
a robot joint member with the heat dissipation structure,
a motor,
a transmission shaft, and
a reducer,
wherein:

the joint member has a hollow barrel structure disposed to be sleeved outside the motor, and at least one phase change heat dissipation unit each axially distributed along a barrel wall;

the phase change heat dissipation unit comprises a phase change working medium, a capillary material and a sealed phase change cavity, wherein the phase change working medium is located inside the phase change cavity, the phase change cavity has a vacuum or negative pressure environment therein, and the capillary material is located on an inner cavity wall of the phase change cavity;

heat dissipation auxiliary ribs are arranged on a periphery of the barrel wall of the joint member and a side of the phase change heat dissipation unit away from the motor; and the heat dissipation auxiliary ribs define a plurality of gas flow channels with cross sections gradually reduced along a gas flow direction, so that gas flows are accelerated in the gas flow channels;

an inner sidewall of the joint member is in contact with a casing of the motor for transferring a heat flow to the phase change heat dissipation units based on a heat conduction path between the joint member and the motor.

10. The robot dynamic joint according to claim 9, wherein the phase change heat dissipation units are plural, uniformly distributed along a peripheral direction of the barrel wall, and located outside or inside the barrel wall.

11. The robot dynamic joint according to claim 10, wherein the number of the plurality of gas flow channels and the plurality of phase change heat dissipation units are equal, and the plurality of gas flow channels and the plurality of phase change heat dissipation units are uniformly distributed along the peripheral direction of the barrel wall, with positions thereof corresponding to each other.

12. The robot dynamic joint according to claim 9, wherein the phase change working medium is a liquid-gas phase change working medium.

13. The robot dynamic joint according to claim 9, wherein the capillary material is at least one of capillary metal, foam metal, foam carbon and sintered powder.

14. The robot dynamic joint according to claim 9, wherein the phase change cavity of each of the phase change heat dissipation units is a non-penetrating groove or hole axially distributed along the barrel wall.

15. The robot dynamic joint according to claim 9, wherein,
the heat dissipation auxiliary ribs are metal heat dissipation auxiliary ribs;
each of the gas flow channels of the heat dissipation auxiliary ribs is axially distributed along the barrel wall;
the heat dissipation auxiliary ribs are periodically distributed along the peripheral direction of the barrel wall, so that the plurality of gas flow channels formed are uniformly distributed along the peripheral direction of the barrel wall.

16. The robot dynamic joint according to claim 9, wherein the plurality of gas flow channels comprise first gas flow channels and second gas flow channels alternately distributed along the peripheral direction of the barrel wall, wherein the first gas flow channels are distributed in a wedge shape in a first direction along the axial direction of the barrel wall and the second gas flow channels are distributed in a wedge shape in a second direction opposite to the first direction along the axial direction of the barrel wall.

17. A bionic robot, comprising the robot dynamic joint with the heat dissipation structure according to claim 9.

* * * * *